(12) United States Patent
Francisquini (10) Patent No.: US 11,239,644 B2
(45) Date of Patent: Feb. 1, 2022

(54) CONDUCTING BUSBAR USED IN AN ELECTRICAL CABINET

(71) Applicant: Melquisedec Francisquini, Cotia (BR)

(72) Inventor: Melquisedec Francisquini, Cotia (BR)

( * ) Notice: Subject to any disclaimer, the term of this patent is extended or adjusted under 35 U.S.C. 154(b) by 0 days.

(21) Appl. No.: 16/646,168

(22) PCT Filed: Sep. 10, 2018

(86) PCT No.: PCT/BR2018/050328
§ 371 (c)(1),
(2) Date: Mar. 11, 2020

(87) PCT Pub. No.: WO2019/046922
PCT Pub. Date: Mar. 14, 2019

(65) Prior Publication Data
US 2020/0274344 A1 Aug. 27, 2020

(30) Foreign Application Priority Data
Sep. 11, 2017 (BR) ................ BR 10 2017 019384-5

(51) Int. Cl.
| | |
|---|---|
| *H01B 5/06* | (2006.01) |
| *H02B 1/20* | (2006.01) |
| *H02B 1/30* | (2006.01) |
| *H02G 5/02* | (2006.01) |
| *H02G 5/06* | (2006.01) |

(52) U.S. Cl.
CPC .............. *H02G 5/02* (2013.01); *H01B 5/06* (2013.01); *H02B 1/20* (2013.01)

(58) Field of Classification Search
CPC ... H02B 1/20; H02B 1/21; H02B 1/30; H02B 1/32; H02G 5/02; H02G 5/025; H02G 5/06; H01B 5/06
USPC .............. 174/149 B, 68.2; 211/26, 182, 192; 361/825; 312/265.1
See application file for complete search history.

(56) References Cited

U.S. PATENT DOCUMENTS

| | | | | |
|---|---|---|---|---|
| 7,052,299 | B2* | 5/2006 | Kim ..................... | H01R 25/006 439/211 |
| 7,102,256 | B2* | 9/2006 | Murakami ............ | H02G 5/005 174/117 F |
| 7,660,102 | B2* | 2/2010 | Brutsch ................. | H02B 1/056 361/648 |
| 10,749,325 | B2* | 8/2020 | Preising ................ | H02G 5/005 |
| 2010/0025105 | A1* | 2/2010 | Hirschfeld ............ | H02B 1/565 174/72 B |
| 2014/0151082 | A1* | 6/2014 | Erdle ..................... | H02B 3/00 174/68.2 |
| 2020/0280180 | A1* | 9/2020 | Francisquini ........... | H02G 5/06 |

* cited by examiner

*Primary Examiner* — Timothy J Thompson
*Assistant Examiner* — Guillermo J Egoavil (57) ABSTRACT

A busbar applied in electrical cabinet disclosing an electrical cabinet set containing main busbars and secondary busbars built in a closed tubular shape, assembled in the referred electrical cabinet, which also presents insulators and secondary insulators, protection system in the main busbar systems, extension set and finally derivation connectors.

17 Claims, 12 Drawing Sheets

FIG. 20

CONDUCTING BUSBAR USED IN AN ELECTRICAL CABINET

RELATED APPLICATIONS

This application is a National Phase of PCT Patent Application No. PCT/BR2018/050328 having International filing date of Sep. 10, 2018, which claims the benefit of priority of Brazilian Patent Application No. BR 10 2017 019384-5 filed on Sep. 11, 2017. The contents of the above applications are all incorporated by reference as if fully set forth herein in their entirety.

FIELD AND BACKGROUND OF THE INVENTION

The present invention is contained within the field of electric control and energization devices, more precisely the field of electrical cabinets and enclosures.

This invention presents an electrical cabinet which busbars applied to it are built in a closed tubular shape and having an exclusive design, reducing the quantity of material applied in the construction thereof and consequently the cost and weight of the cabinet, wherein said busbar presents a series of holes and mechanical accessories that thoroughly facilitate the assembly in the cabinet as regards installing extenders, derivation connectors and insulators.

The electric enclosures or cabinets as they are also known, are important electric devices and amply used in industry in a general manner.

Their basic function is to energize and/or control equipment, devices, areas or work cells, in industrial plants, being adaptable to nearly all areas of the industry, automation and/or services.

The electrical cabinets are normally divided in compartments or drawers, which hold a diversity of assembled components, with diverse purposes.

In the majority of the applications, the electrical cabinets are connected to the primary electric power grid by means of busbars, which are built in copper or other conductor material, that carry out the distribution of current between the primary grid and the electrical cabinets, which will feed the equipment connected to them.

In view of these intrinsic characteristics of the electric busbars, they are nearly all made of copper, since this presents low resistivity, providing a good electric conductivity, with a relatively low manufacturing cost in comparison with other conductor materials such as silver and gold.

However, the conductor busbars, due to the fact that they are subject to high values of alternating current, suffer a high incidence of peel resistance, that is, the useful area for conducting electricity is reduced, since the alternating current tends to concentrate on the outer portions of the conductor in detriment of its central portion.

When applied to electrical cabinets, the busbars use accessories that supplement the assembly thereof, such as derivation connectors and splice connectors. However, this assembly accessory supposes complex assembly schemes, since the holes used in these bars are specific, that is, made according to demand for the application thereof.

Another disadvantage in the use of this kind of bar in electrical cabinets resides in the fact that the complete set has an elevated weight, since the bars are solid and the eventual fixation and assembly systems thereof in the cabinets tend to be more robust to support their efforts, thus increasing the weight of the cabinet.

SUMMARY OF THE INVENTION

The purpose of the present invention is to present a low-tension electrical cabinet, containing in the application thereof high current busbars of the closed tubular type with an exclusive design, with better efficiency using a smaller amount of conductor material, reducing its weight and manufacturing cost.

Another objective of the present invention resides in the fact that the closed tubular busbar presents a series of holes which facilitate the assembly in the electrical cabinet.

Finally, the present invention further presents a preferred embodiment for the insulators, derivation connectors and extenders used in the assembly of these closed tubular busbars applied in electrical cabinets, as well as a mechanical protection set in the main busbar.

BRIEF DESCRIPTION OF THE SEVERAL VIEWS OF THE DRAWINGS

The object matter of the present invention will become totally clear in its technical aspects from the detailed description, which will be made based on the below listed figures, wherein.

DESCRIPTION OF SPECIFIC EMBODIMENTS OF THE INVENTION

In accordance with the objectives presented by means of the brief description, the present patent application presents an electrical cabinet (1) set, containing main busbars (B) having a closed tubular form and secondary busbars (B'), also in a closed tubular form.

The main busbars (B) present a triple wall (9) in the lower portion, which comprises central holes that are equidistant among each other in all its extension, that is, length. Right above the triple wall (9) there is a substantially-cubic hollow-shape lower structure, where the triple wall (9) is aligned to one of the side walls of the lower structure.

The main bulbar (B) further presents, right above the lower structure a top structure having the same shape as the lower structure, that is, substantially-hollow cubic shape. The top structure is interconnected to the lower structure by means of a double central wall (11) placed in its central portions, where in the referred double central wall (11) there are three sets of holes, where each set contains five equidistant holes, in such a manner that the set of holes is in the central portion of the length of the double central wall (11) and the other two in each extremity of the length of the referred double central wall (11).

The main busbar (B) is built in a continuous manner, that is, there are no welding points or externally forged interconnections, regardless of the means used in the manufacture thereof, which contributes to a high mechanical resistance, since said welding points or forged interconnections would present weak points during higher efforts.

The electrical cabinet (1) presents, apart from the main conductor busbar (B) a set of secondary busbars (B') which presents a simple triple wall (10) and a sole central structure (11) with a substantially-hollow cubic shape, where the simple triple wall (10) is located in the central portion of the lower wall of the sole central structure (11); the term simple triple wall and the term central triple wall are used interchangeably along this description.

Both the main busbar (B) as the secondary busbar (B') are noted for being built in a closed tubular shape, which emphasizes the economy of conductor material used in the building thereof as well as by the reduction of the respective weights.

Another outstanding feature for both of the main busbar (B) and the secondary busbar (B') resides in the fact that both contain a triple wall (9) comprising hollow holes that are equidistant from each other, where this triple wall (9) is very important both in the assembly of the busbars in the electrical cabinet as in the connection of other elements to these busbars, such as derivation connections, splice connections, among others.

The electrical cabinet (1) comprises insulators (2) which present a substantially-parallelepiped bipartite shape in its horizontal angle, where the parts are united by screws. The referred insulators (2) contain in their central portion three thru holes in the shape of the main busbar (B) system outline where in the lower portion of the insulators (2), in the inner part of the thru hole, there are two recesses.

The referred recesses in the inner part of the thru holes of the insulators (2) have the purpose of fitting the triple wall (9) of the main busbar (B) system providing more stability and sustenance to the same, permitting the junction of two main busbars (2) in a mirrored manner.

The upper portion of the insulators (2) comprises, in the inner part of its thru hole a central step which permits a perfect fit of the upper structure of the main busbar (B), where the referred step is the limiter and separator between the two main busbars (B) assembled in the interior of each thru hole of the insulator (2).

In its side and upper portions, the insulator (2) contains a series of straight hook shaped slots, spaced equidistant from each other, throughout the whole side and upper portions. These hook shaped slots have the purpose of permitting the fitting of the mechanical protection (3). Apart from the straight hooks, the insulator (2) comprises rail type slots, that permit the assembly of the internal protection plates between phases of the main busbar (B).

The insulators (2) may be mounted over all the extension of the main busbars (B), as per the application or the mounter's choice as to the best results in the assembly between the main busbar (B) and the electrical cabinet (1), whereby the main function is to avoid the mechanical contact between the main busbars (B).

The electrical cabinet (1) contains, apart from insulators (2) used in the main busbars (B) secondary insulators (2'), which are used in the secondary busbars (B'). These secondary insulators (2') have a substantially-parallelepiped bipartite shape in their horizontal angle, where the parts are united, preferably, by screws.

The referred secondary insulators (2') contain a central opening, which is divided between the two parts of the secondary insulator (2'), where one recess is in the lower portion of the secondary insulator having a rectangular shape and one recess is in the upper portion of the secondary insulator (2') having a square shape, where, in the lower portion the central triple wall (10) of the secondary bulbar (B') fits and in the upper portion the hollow central structure of the same fits.

The electrical cabinet (1) presents a mechanical protection system (3) which is formed by a series of plates in insulating material, which present a series of holes in their faces, which align with the straight hook shaped slots of the insulators (2), so that the protection system may be assembled in the insulators (2), preventing the access to the main busbar (B) system.

The faces of the mechanical protection system (3) present the holes not only to permit the assembly of the insulators (2) but also to cooperate with the air circulation and subsequent cooling of the main busbars (B), increasing the safety of the electrical cabinet (1) without compromising the working conditions of the same.

Figure 1:
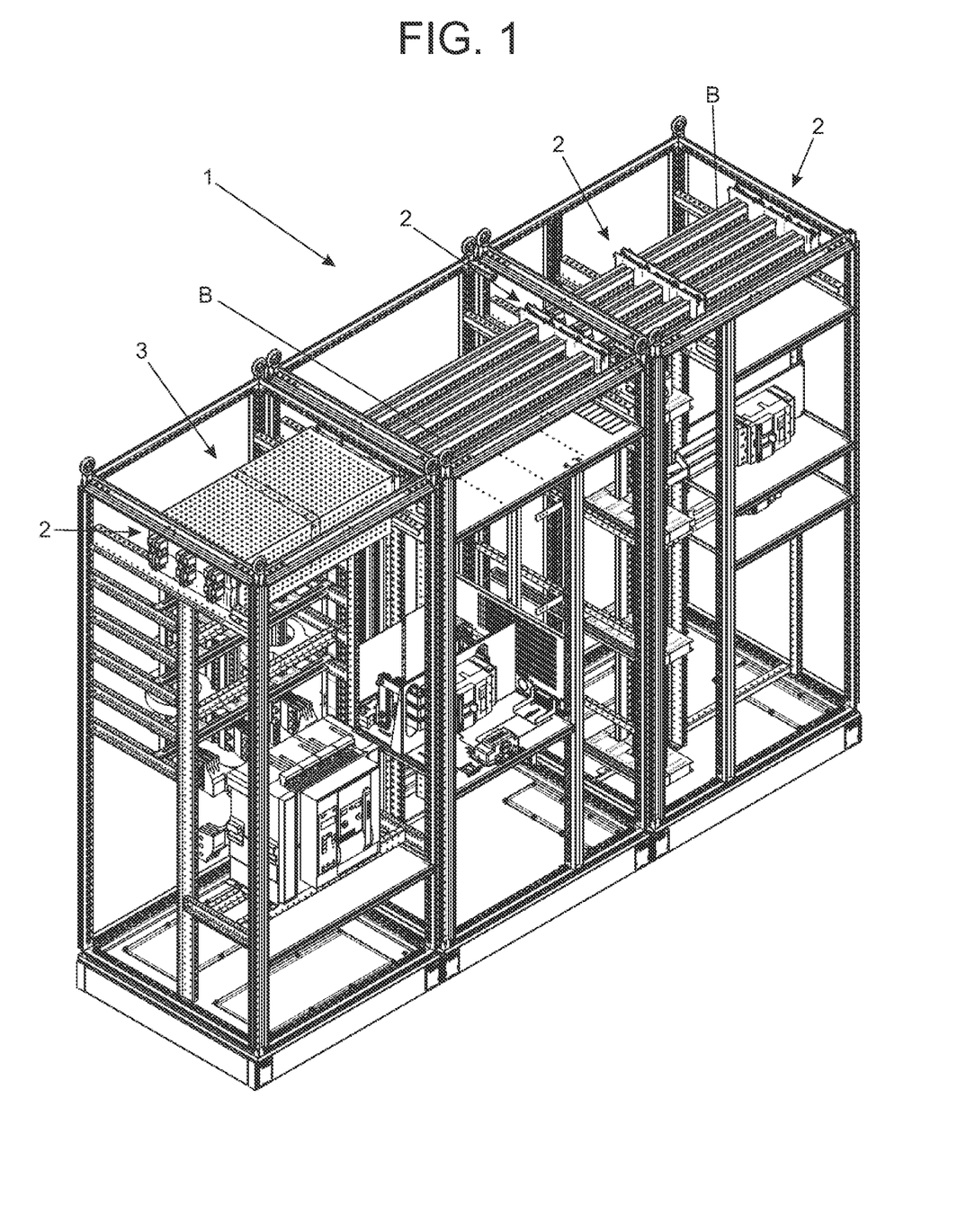
FIG. 1 presents a perspective view of the electrical cabinet containing conductor busbars of the closed tubular type.
Figure 2:
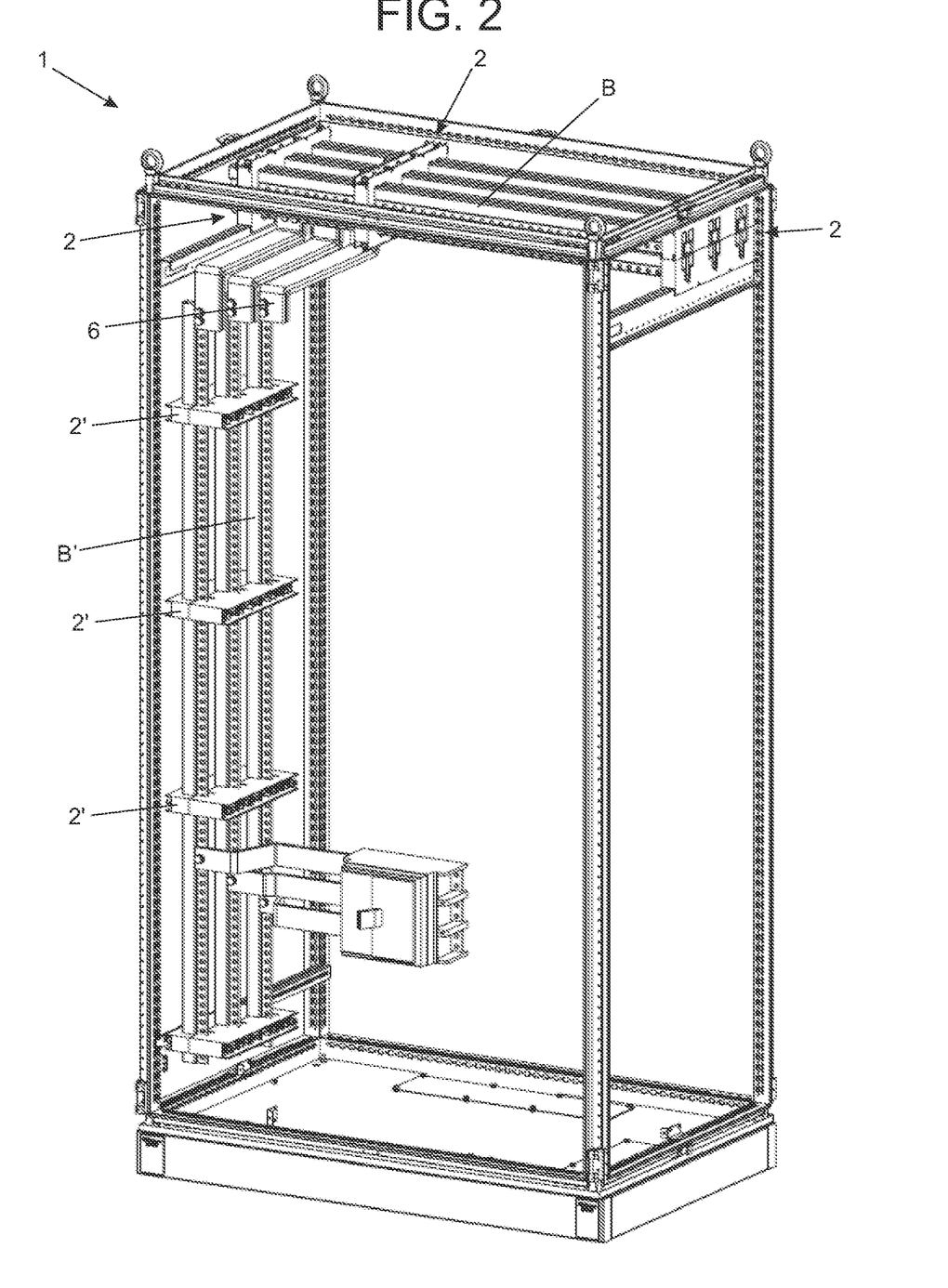
FIG. 2 presents a view of the electrical cabinet containing main busbars, secondary busbars, insulators and switch set.
Figure 3:
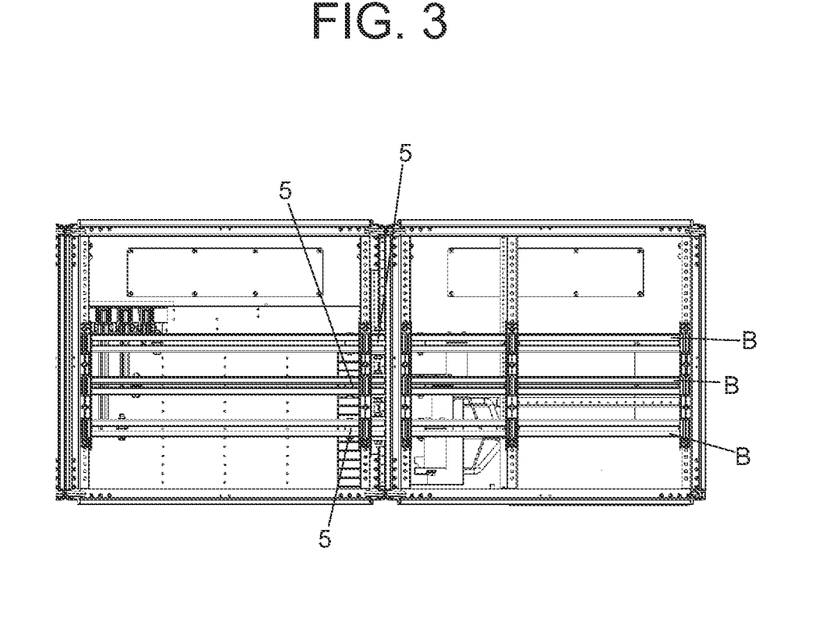
FIG. 3 presents a top view of the electrical cabinet containing busbars of the closed tubular type.
Figure 4:
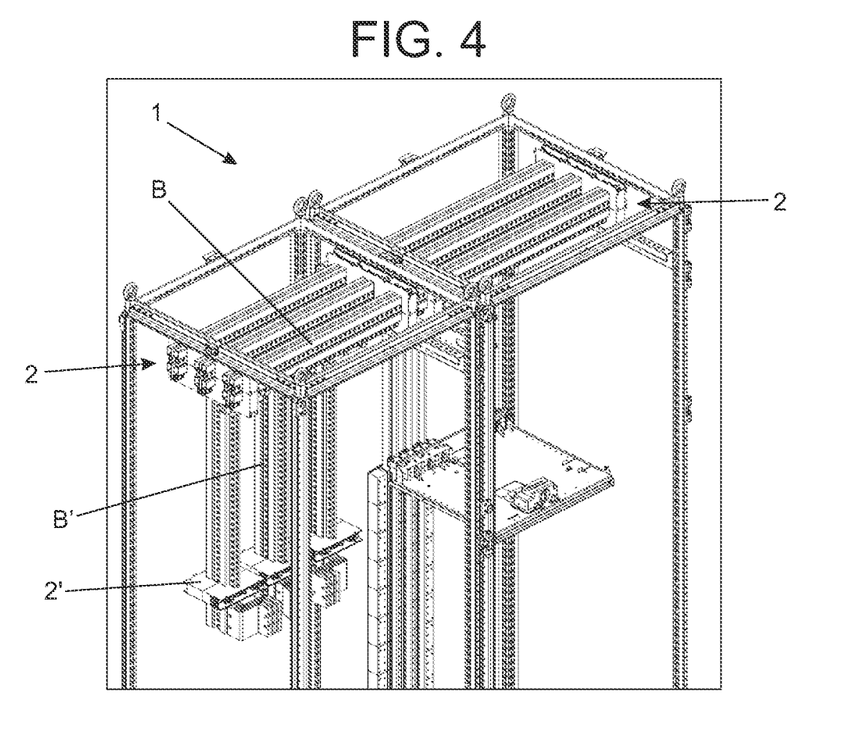
FIG. 4 presents a close view of the main busbars and the secondary busbars containing their respective insulators.
Figure 5:
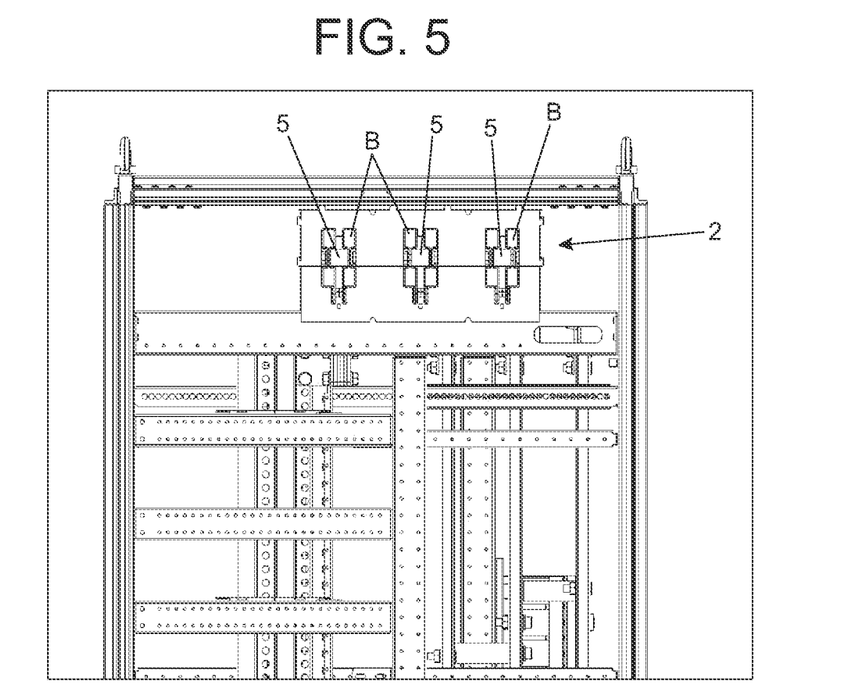
FIG. 5 presents a side view of the closed tubular busbars containing a main insulator, assembled in an electrical cabinet.
Figure 6:
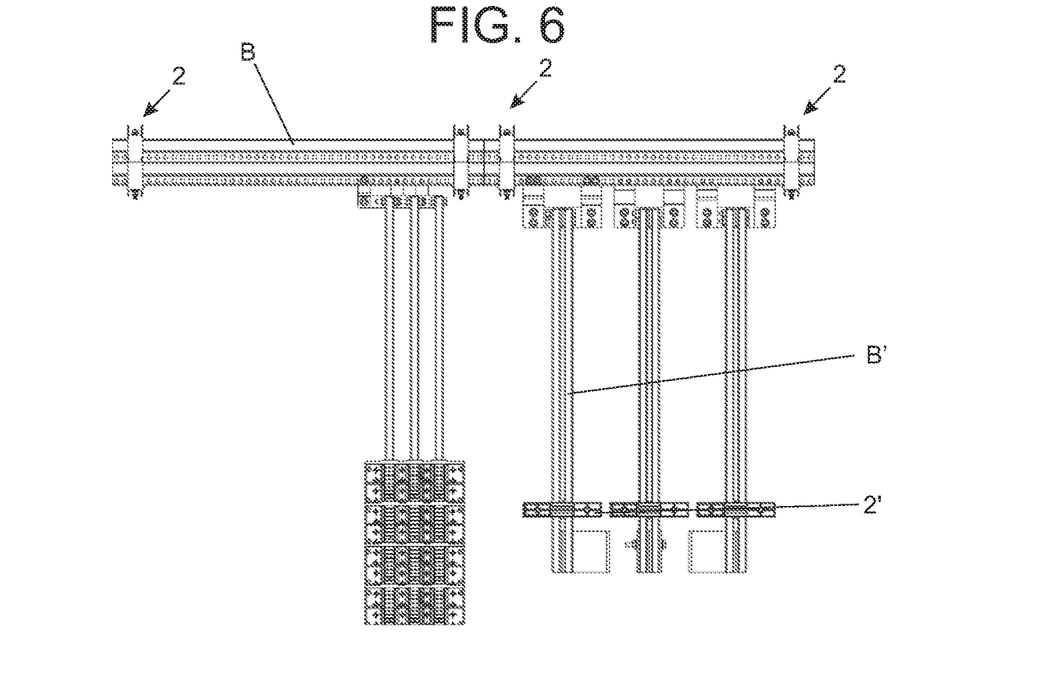
FIG. 6 presents a back view of the interconnection of the main busbar with the secondary entry and exit conductors.
Figure 7:
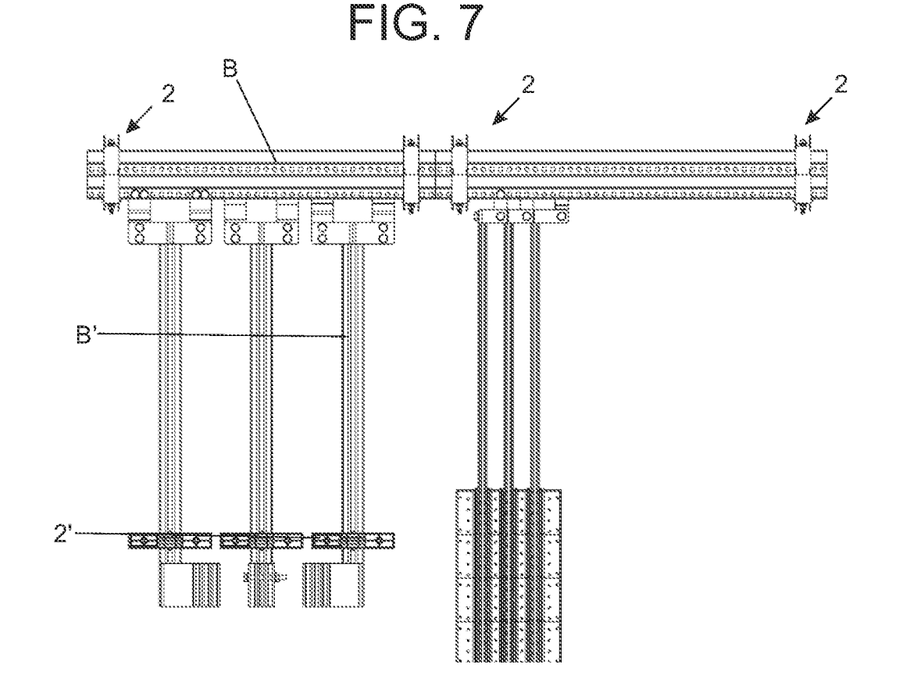
FIG. 7 presents a front view of the interconnection of the main busbar with the secondary entry and exit conductors.
Figure 8:
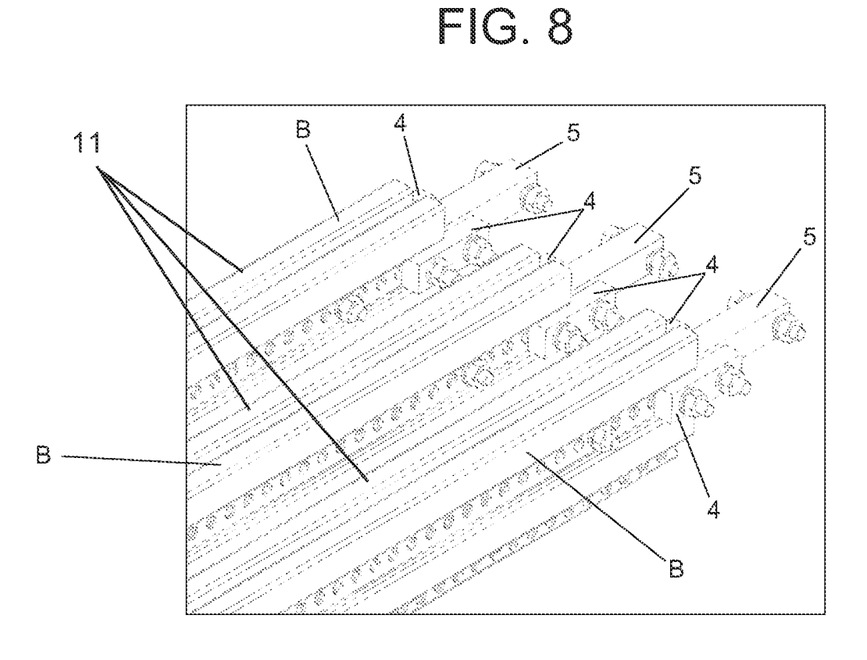
FIG. 8 presents a detailed back view of the assembly of the splice connections applied in closed tubular busbars assembled in electrical cabinets.
Figure 9:
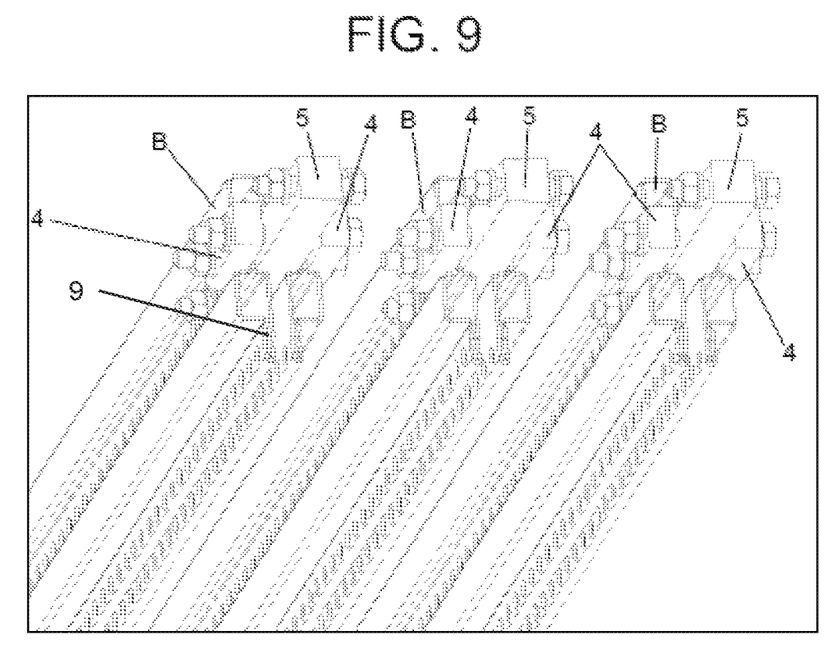
FIG. 9 presents a detailed front view of the splice connections assembled in closed tubular busbars.
Figure 10:
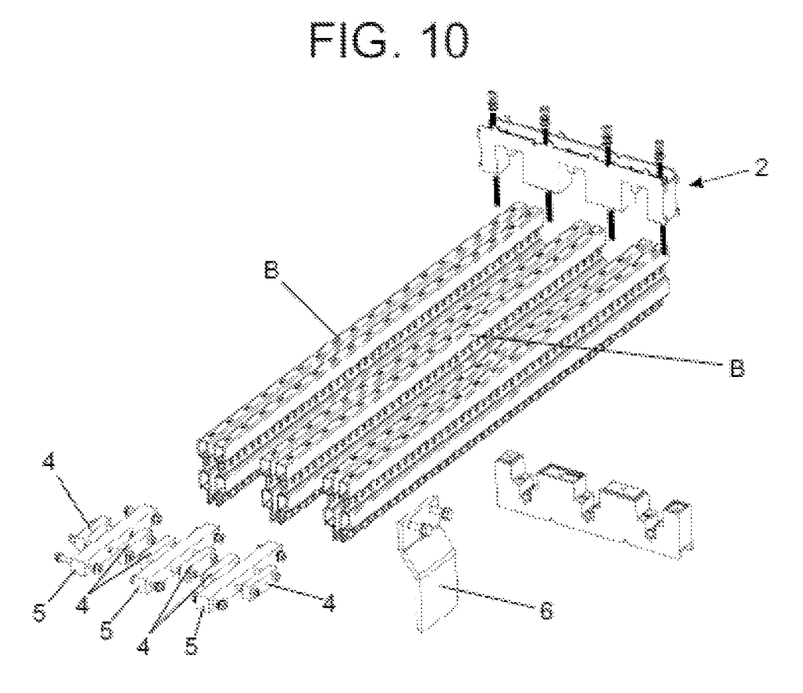
FIG. 10 presents an exploded perspective view of the main busbars and their set of splice connectors.
Figure 11:
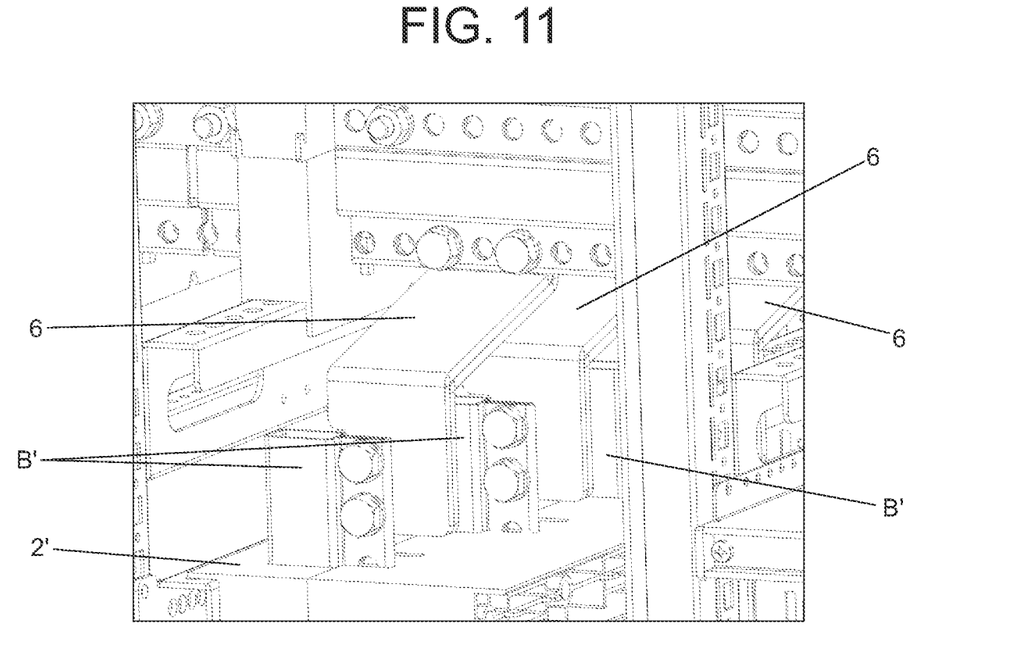
FIG. 11 presents a close view of the set of derivation connections.
Figure 12:
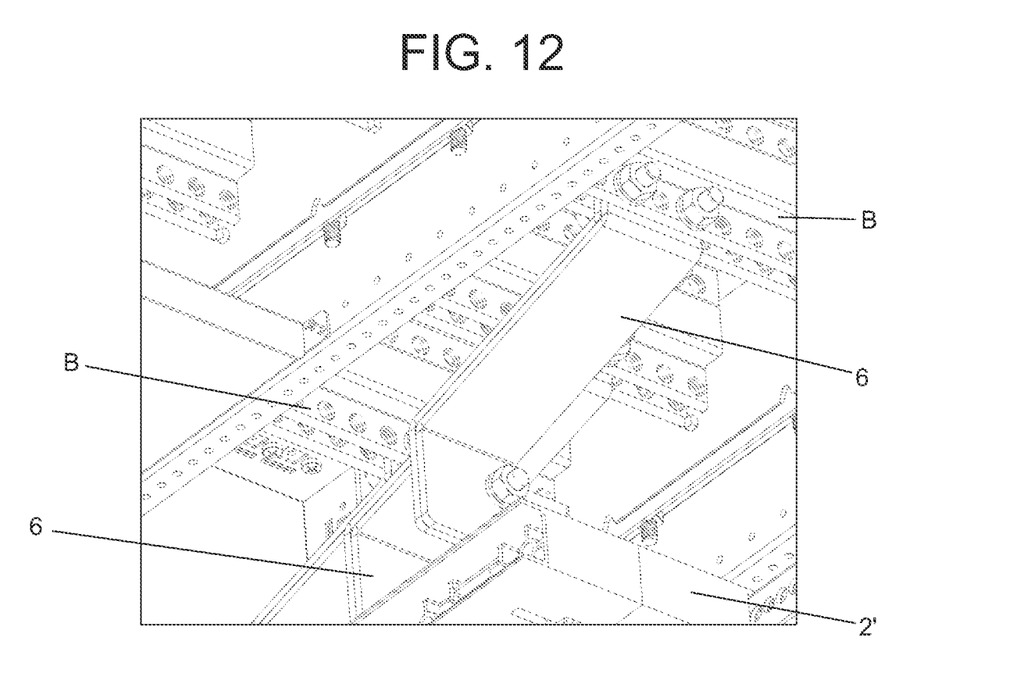
FIG. 12 presents a detailed back view of the derivation connectors applied in closed tubular busbars assembled in electrical cabinets.
Figure 13:
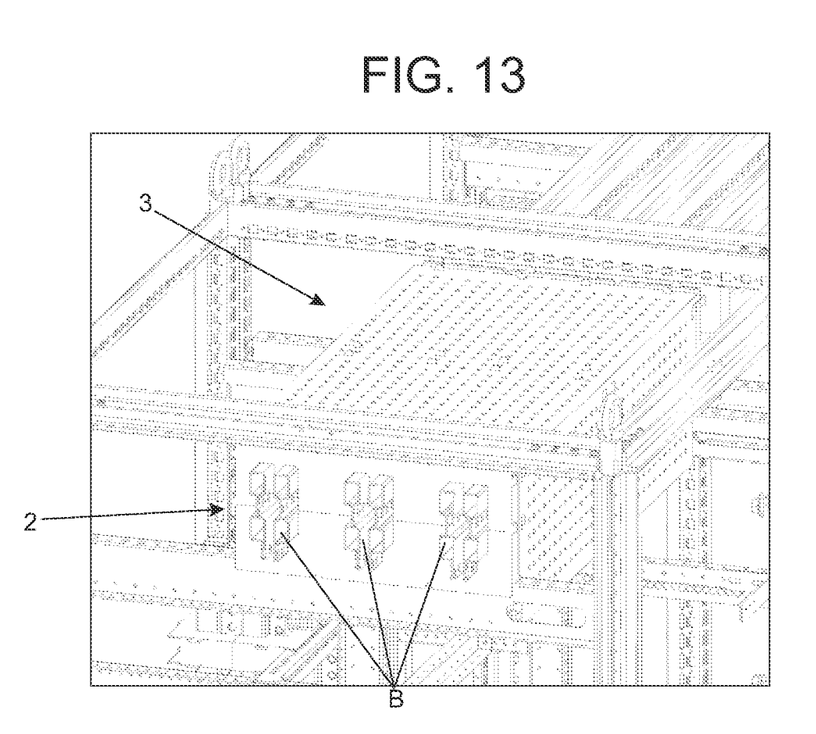
FIG. 13 presents a perspective view of the mechanical protection used in closed tubular busbars assembled in electrical cabinets.
Figure 14:
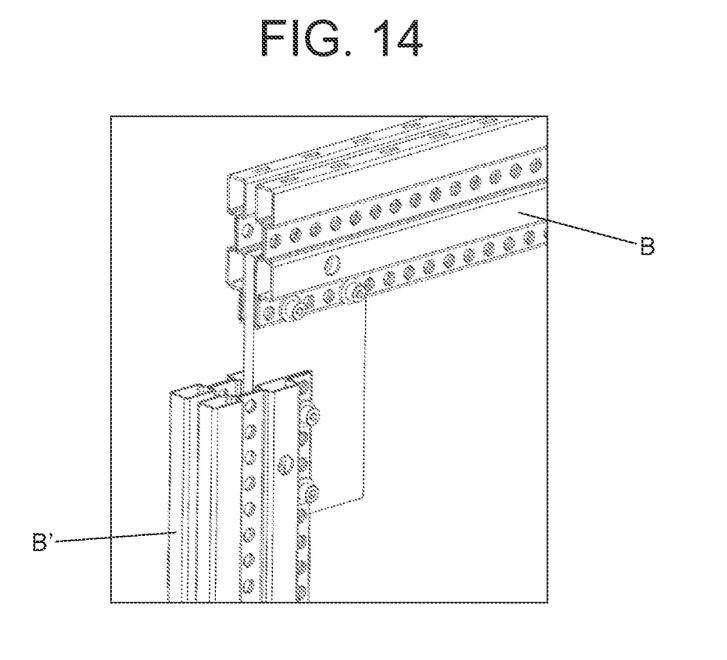
FIG. 14 presents a view containing main busbars united by splice connections.
Figure 15:
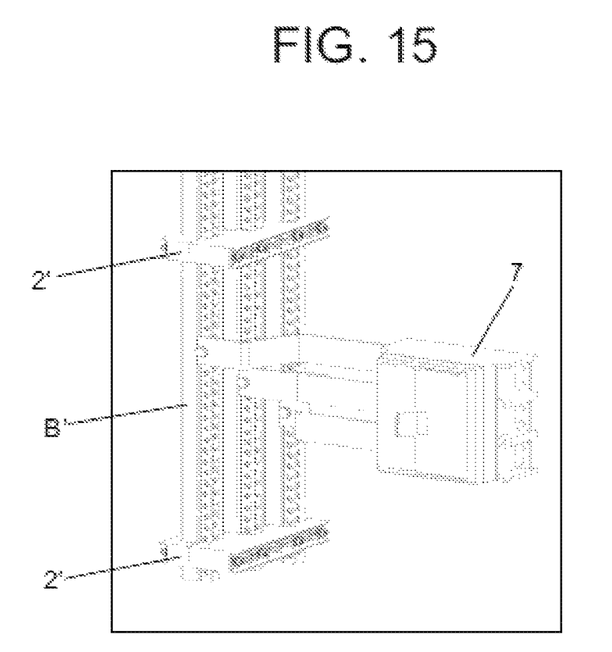
FIG. 15 presents a view of the switch set assembled in a secondary busbar.

The mechanical protection system (3) permits the assembly of walls in the interior of its structure, with the purpose of insulating each main busbar (B) that forms a phase, in the electrical cabinet, which can be visualized in FIG. 15, thus increasing the safety of the mechanical protection system (3).

The electrical cabinet (1) set further presents a set of splice connectors, which permit the union of two main busbars (B). This set of splice connectors is formed by two supporting slots (4) and a central billet (5).

The supporting slots (4) of the splice connection set of the electrical cabinet (1) set have a parallelepiped shape, preferably built in copper or other conductor material, presenting two holes aligned horizontally in their sides, said holes being compatible to the holes present in the central double wall (11) of the main busbar (B).

The central billet (5) presents a parallelepiped shape, being preferably built in copper or other conductor material, having dimensions that permit the perfect fit thereof between the central walls of the main busbar (B) when placed in a mirror manner in a phase. Said central billet (5) presents holes, which are compatible with the holes present in the central double wall (11) of the main busbar (B) system.

In the assembly thereof, the splice connection set of the electrical cabinet (1) set foresees two supporting slots (4), being opposite one another, so that between them are located the central double walls (11) of the main busbar (B) containing, between them, a central billet (5), where the union of these parts is carried out by means of two screws, of the same material as the main busbar (B) located in the holes in the supporting slots (4).

The electrical cabinet (1) set further presents derivation connections (6) which enable the union between the main busbar (B) and the secondary busbar (B'). The referred derivation connections (6) are preferably built in copper or other conductor material, having a shape similar to a "Z", that is, two flaps united by a central portion inclined in an angular manner, where both flaps have two equidistant holes.

The assembly of the derivation connections (6) comprises the alignment of its flaps to one or two triple walls (9) of the main busbar (B), being united to these by screws, so that, if united to two main busbars (B) the referred flap of the derivation connections (6) will be located between the two main busbars (B).

The other derivation connection (6) flap will be aligned to the central triple wall (10) of the respective secondary busbar (B'), being united to this by means of screws, preferably built of the same material as that of the secondary busbar (B').

Figure 18:
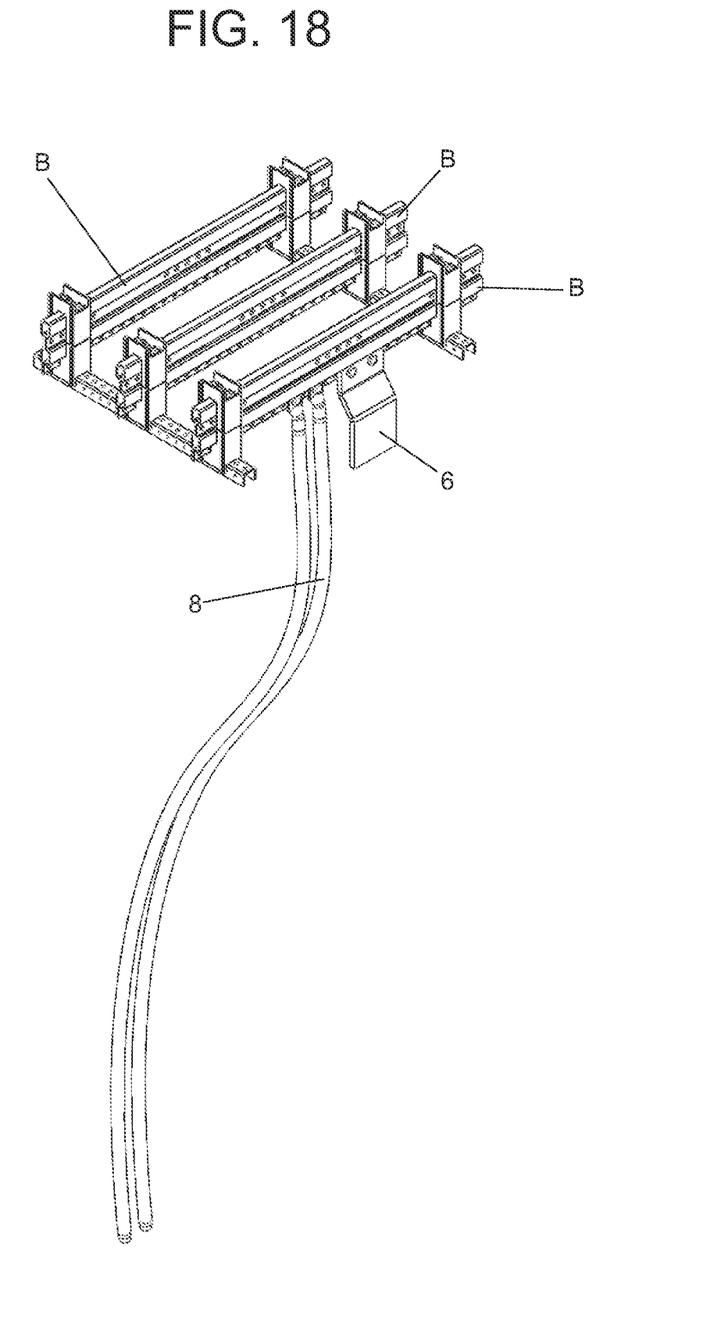
FIG. 18 presents a perspective view of the main busbar highlighting the flap with holes for connecting the derivations.
Figure 19:
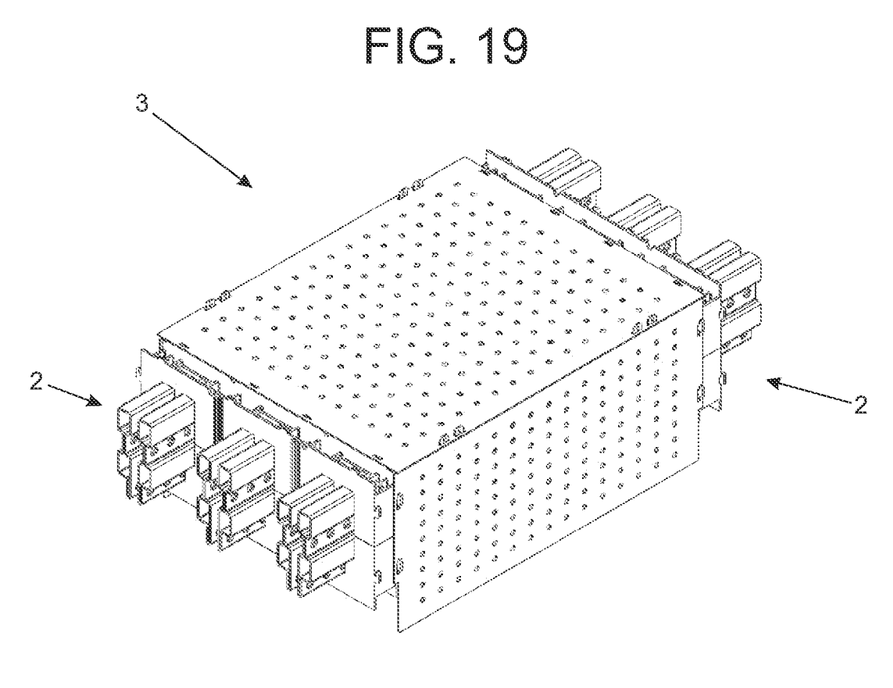
FIG. 19 presents a perspective view of the protection used in closed tubular electric busbars applied in electrical cabinets.
Figure 20:
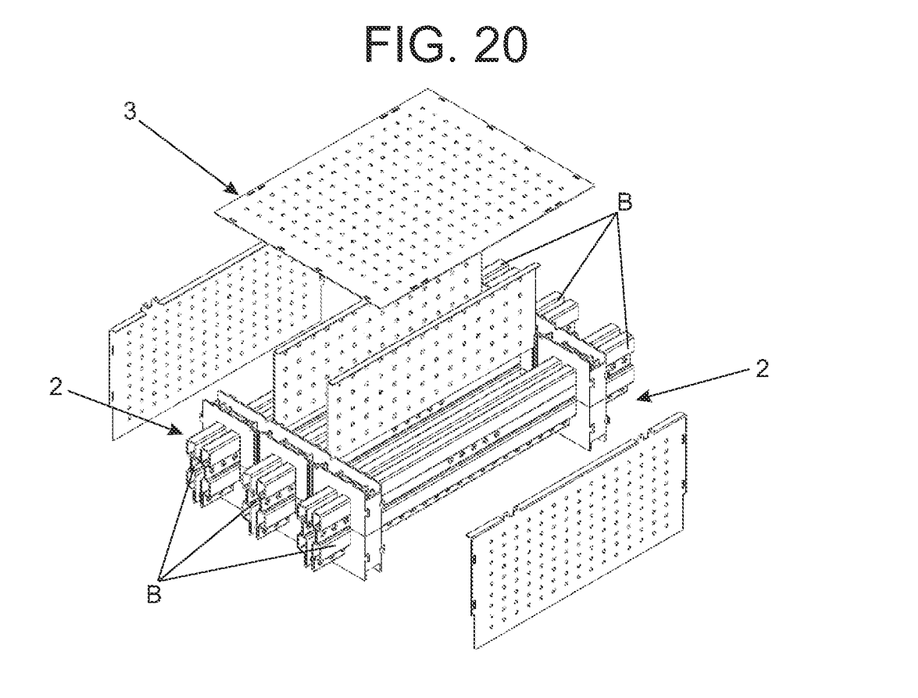
FIG. 20 presents a perspective view of the protection used in closed tubular electric busbars without the top portion.

The electrical cabinet further presents direct connection cables (8), which connect to the triple wall (9) of the main busbar (B), by means of an eye type hook, providing the energization of another device or switch, directly connected to the main busbar (B), as per FIG. 18.

Figure 16:
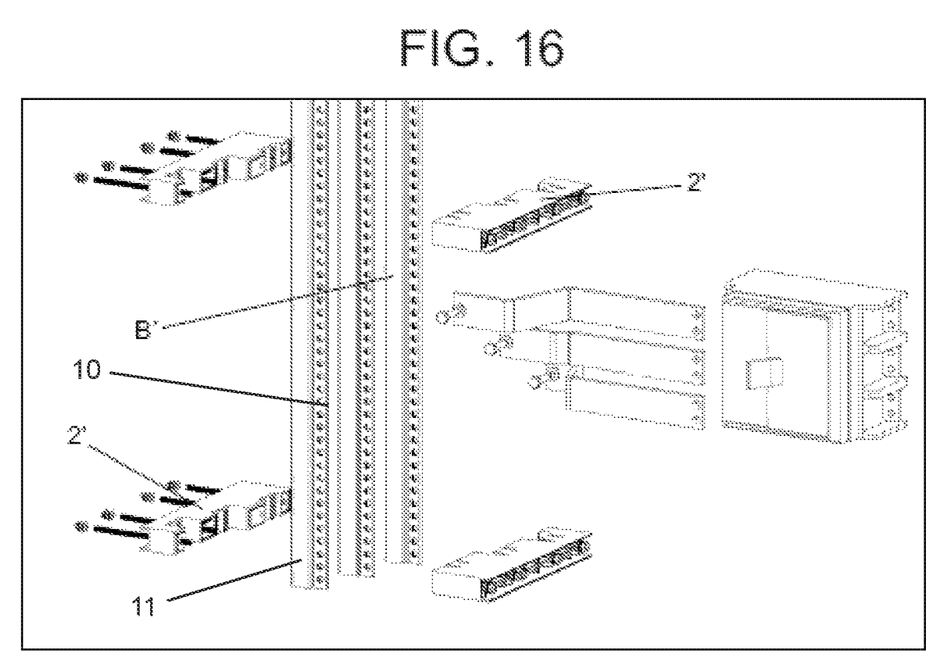
FIG. 16 presents an exploded perspective view of the circuit breaker assembly and secondary busbar with clamping insulators.
Figure 17:
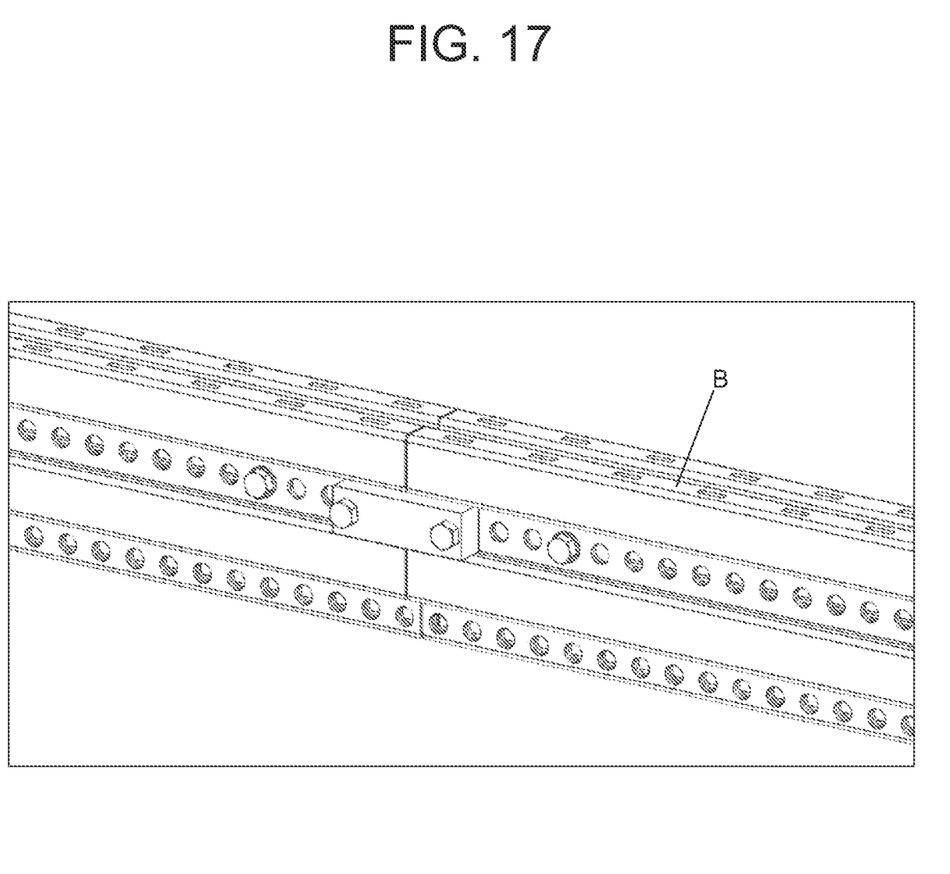
FIG. 17 presents a perspective view of the main busbars united by splice connectors.

Finally, the electrical cabinet presents switch sets (7), which are connected to the secondary busbar (B'). Said switch set (7) presents a derivation connection formed of conductor material, which connects to the triple central wall of the secondary busbar (B'), being united to this one by means of its holes, where each switch set (7) connects to three phases, that is, three different secondary busbars (B'), as per FIGS. 16 and 17.

The referred electrical cabinet (1) has as main advantages the main busbar (B) and the secondary busbar (B') which permit a considerable reduction in the quantity of material used in the manufacture thereof, without prejudice to their electric conductivity nor to their mechanical resistance.

Another advantage present in the electrical cabinet (1) is present in the several holes presented both by the main busbar (B) as in the secondary busbar (B'), which permit a considerable facility in the assembly of these elements in the electrical cabinet (1) as well as more ease in the assembly of the derivation connections (6) and the extender set.

The electrical cabinet (1) further presents more safety in relation to the remaining electrical cabinets present in the state of the art, since it comprises a mechanical protection system (3) totally compatible with the insulators (2) so that the main busbars (B) are completely isolated from the handling by workers without any prejudice to the ideal working conditions of the electrical cabinet (1).

It must be understood that the present description does not limit the application to the details herein described and that the invention is capable of other embodiments and of being practiced or executed in several manners, within the scope of the claims. Although specific terms were used, said terms must be interpreted in a generic and descriptive sense, and not with the intention of limitation.

The invention claimed is:

1. A conducting busbar used in an electrical cabinet, containing a main busbar, a secondary busbar, a plurality of insulators, a plurality of extenders and a plurality of derivation connections, wherein the electrical cabinet contains said main busbar built in a continuous manner along a first plane of a frame of said electrical cabinet, presenting a triple wall in its lower portion, which comprises central holes equidistant from each other in all its extension, that is, length, a substantially-cubic hollow-shape lower structure, where the triple wall is aligned to one of the side walls of the lower structure, a substantially-cubic hollow-shape upper structure, where the upper structure is interconnected to the lower structure by means of a double central wall placed in its side portions, wherein said double central wall there are three sets of holes, where each set contains five holes equidistant from each other, in a manner that a set of holes is in the central portion of the length of the double central wall and the other two in each extremity of the length of the referred double central wall; said secondary busbar extending along a second plane of said frame of said electrical cabinet, perpendicular to said first plane and containing a simple triple wall and a sole central structure having a substantially-hollow cubic shape, wherein the simple triple wall is located in the central portion of the lower wall of the sole central structure; wherein said plurality of insulators are connected to said main busbar, a plurality of secondary insulators are connected to said secondary busbar, a mechanical protection system is mounted to protect said main busbar, a splice connection set mechanically and electrically connecting a plurality of segments of said main busbar, a derivation connection set mechanically and electrically connecting between said main busbar and said secondary busbar, a switch set connected to said secondary busbar and a plurality of direct connection cables connected to said main busbar.

2. A conducting busbar used in an electrical cabinet, according to claim 1, wherein the insulators have a substantially-parallelepiped bipartite shape in horizontal angle, wherein their parts are united by screws, wherein its central portion are located three thru holes with the shape of the outline of the main busbar wherein the lower portion of the insulators, in the inner part of the thru hole, there are two recesses.

3. A conducting busbar used in an electrical cabinet, according to claim 1, wherein the insulators have a central step in the inner part of their thru hole.

4. A conducting busbar used in an electrical cabinet, according to claim 1, wherein the insulator presents in its side and upper portions a series of slots in straight hook shape, spaced equidistant from each other, throughout sides and upper portions, as well as rail type slots, which permit mounting the inner protection plates between phases of the main busbars.

5. A conducting busbar used in an electrical cabinet, according to claim 1, wherein the secondary insulators have a substantially-parallelized bipartite shape in their horizontal angle, wherein their parts are united preferably by screws, wherein a central opening is contained, which is divided between the two parts of the secondary insulator, where one recess is in the lower portion of the secondary insulator having a rectangular shape and a recess in the upper portion of the secondary insulator having a square shape, where, in the lower portion, the central triple wall of the secondary busbar is fitted and in the upper portion the hollow central structure of same is fitted.

6. A conducting busbar used in an electrical cabinet, according to claim 1, wherein the secondary insulator is mounted on the secondary busbar.

7. A conducting busbar used in an electrical cabinet, according to claim 1, wherein the protection system is formed by a series of plates, preferably metallic ones, which present a series of holes in their faces, which are aligned to the slots in a straight hook format of the insulators, in a manner that the protection system may be mounted on the insulators preventing the access to the main busbars.

8. A conducting busbar used in an electrical cabinet, according to claim 1, wherein the splice connection is formed by supporting slots and a central billet.

9. A conducting busbar used in an electrical cabinet, according to claim 1, wherein the supporting slot has a parallelepiped shape, preferably built in copper or other conductor material, presenting two holes horizontally aligned in their sides, said holes being compatible with the holes present in the double central wall of the main busbar.

10. A conducting busbar used in an electrical cabinet, according to claim 1, wherein the central billet has a parallelepiped shape, being preferably built in copper or other conductor material, having dimensions that permit its perfect fit between the central walls of the main busbar when placed in a mirror format in a phase.

11. A conducting busbar used in an electrical cabinet, according to claim 1, wherein the central billet has holes, which are compatible with the holes present in the double central wall of the main busbar.

12. A conducting busbar used in an electrical cabinet, according to claim 1, wherein the splice connection set presents its main assembly containing two supporting slots being one opposite to the other, so that between them are located the double central walls of the main busbar containing, between them a central billet, where the union between these parts is made by means of two screws, of the same material as the main busbar located in the holes of the supporting slots.

13. A conducting busbar used in an electrical cabinet, according to claim 1, wherein the set of derivation connections is built preferably in copper or other conductor material, being shaped similar to a "Z", that is, two flaps united by an inclined central portion in angular manner, where both flaps have two equidistant holes.

14. A conducting busbar used in an electrical cabinet, according to claim 1, wherein the set of derivation connections connects mechanically and electrically the main busbars to the secondary busbar of the respective phase.

15. A conducting busbar used in an electrical cabinet, according to claim 1, wherein the assembly of the set of derivation connections comprises the alignment of its flaps to one or two triple walls of the main busbar, being united to these by screws, so that if united to two main busbars, the referred flap of the derivation connections will be between the two main busbars.

16. A conducting busbar used in an electrical cabinet, according to claim 1, wherein the direct connection cables, connect to the triple wall of the main busbar, by means of an eye type connector, making the energization of another device or switch, directly connected to the main busbar.

17. A conducting busbar used in an electrical cabinet, according to claim 1, wherein the switch set, connects to the secondary busbar by means of a derivation connection formed of conductor material, which is connected to a central triple wall of the secondary busbar, being united to this by means of its holes, where each switch set is connected to three phases, that is, three different secondary busbars.

* * * * *